US006848037B2

(12) United States Patent
Flaherty et al.

(10) Patent No.: US 6,848,037 B2
(45) Date of Patent: Jan. 25, 2005

(54) DATA PROCESSING ARRANGEMENT AND METHOD

(75) Inventors: Dermot Flaherty, Southampton (GB); David J. Fisher, Dorset (GB); Stephen J. Hobson, Hampton (GB); Paul Hopewell, Chandlers Ford (GB); Paul Kettley, Winchester (GB); Robert D. Millar, Fareham (GB); Peter Siddall, Romsey (GB); Stephen R. Walker, Lockerley (GB)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 10/228,615

(22) Filed: Aug. 27, 2002

(65) Prior Publication Data

US 2003/0191918 A1 Oct. 9, 2003

(30) Foreign Application Priority Data

Apr. 8, 2002 (GB) .............................. 0207969

(51) Int. Cl.⁷ .............................................. G06F 12/00
(52) U.S. Cl. ........................ 711/162; 711/100; 711/154
(58) Field of Search ................................ 711/100, 154, 711/161, 162, 170

(56) References Cited

U.S. PATENT DOCUMENTS

| | | | |
|---|---|---|---|
| 5,317,739 A | 5/1994 | Elko et al. ................... 395/650 |
| 5,331,673 A | 7/1994 | Elko et al. ................... 395/575 |
| 5,339,405 A | 8/1994 | Elko et al. ................... 395/575 |
| 5,339,427 A | 8/1994 | Elko et al. ................... 395/725 |
| 5,388,266 A | 2/1995 | Frey et al. ................... 395/700 |
| 5,390,328 A | 2/1995 | Frey et al. ................... 395/650 |
| 5,392,397 A | 2/1995 | Elko et al. ................... 395/200 |
| 5,394,542 A | 2/1995 | Frey et al. ................... 395/575 |
| 5,394,554 A | 2/1995 | Elko et al. ................... 395/800 |
| 5,410,695 A | 4/1995 | Frey et al. ................... 395/650 |
| 5,450,590 A | 9/1995 | Elko et al. ................... 395/700 |
| 5,457,793 A | 10/1995 | Elko et al. ................... 395/600 |
| 5,463,736 A | 10/1995 | Elko et al. ................... 395/848 |
| 5,465,359 A | 11/1995 | Allen et al. .................. 395/700 |
| 5,493,668 A | 2/1996 | Elko et al. ................... 395/457 |
| 5,515,499 A | 5/1996 | Allen et al. .................. 395/182 |
| 5,537,574 A | 7/1996 | Elko et al. ................... 395/468 |
| 5,544,345 A | 8/1996 | Carpenter et al. ........... 395/477 |
| 5,561,809 A | 10/1996 | Elko et al. ................... 395/800 |
| 5,581,737 A | 12/1996 | Dahlen et al. ............... 395/497 |
| 5,604,863 A | 2/1997 | Allen et al. .................. 395/182 |
| 5,617,566 A * | 4/1997 | Malcolm ...................... 707/204 |
| 5,630,050 A | 5/1997 | Neuhard et al. ............. 395/183 |
| 5,634,072 A | 5/1997 | Allen et al. .................. 395/674 |
| 5,664,155 A | 9/1997 | Elko et al. ................... 711/170 |
| 5,737,600 A | 4/1998 | Geiner et al. ............... 395/616 |
| 5,742,830 A | 4/1998 | Elko et al. ................... 395/728 |
| 5,860,115 A | 1/1999 | Neuhard et al. ............. 711/147 |
| 5,875,484 A | 2/1999 | Neuhard et al. ............. 711/167 |
| 5,907,672 A * | 5/1999 | Matze et al. .................... 714/8 |
| 5,911,148 A * | 6/1999 | Anglin et al. ................ 711/111 |
| 6,000,020 A * | 12/1999 | Chin et al. ................... 711/162 |
| 6,098,148 A * | 8/2000 | Carlson ....................... 711/112 |
| 6,141,773 A * | 10/2000 | St. Pierre et al. ............. 714/20 |
| 6,505,216 B1 * | 1/2003 | Schutzman et al. ......... 707/204 |
| 6,574,662 B2 * | 6/2003 | Sugiyama et al. .......... 709/223 |

OTHER PUBLICATIONS

Nick et al "S/390 cluster technology: Parallel Sysplex", IBM Systems Journal, vol. 36, no 2, 1997, pp. 172–201.

* cited by examiner

Primary Examiner—Tuan V. Thai
(74) Attorney, Agent, or Firm—Jeffrey S. LaBaw

(57) ABSTRACT

A data processing system (100) and method for creating a fuzzy backup (116) only of objects older than a predetermined threshold, and restoring from the fuzzy backup and from a record log (114) replayed from a time equal to the predetermined threshold before the fuzzy backup start time.

This provides advantages of reduced resource cost for the fuzzy backup and reduced restore time.

10 Claims, 3 Drawing Sheets

DATA PROCESSING ARRANGEMENT AND METHOD

CROSS-REFERENCE TO RELATED APPLICATION

This application is related to the commonly owned copending application, incorporated herein by reference, filed on the same date as the present application, titled "DATA PROCESSING ARRANGEMENT AND METHOD" and having applicant's Ser. No. 10/228,636.

FIELD OF THE INVENTION

This invention relates to data processing and more particularly to a data processing arrangement and method for fuzzy backup and restore of objects therein.

BACKGROUND OF THE INVENTION

IBM's MQSeries® is a set of middleware products that allow user applications to intercommunicate using messages, without having to know the complexities of the underlying hardware and software platform. Applications communicate using the MQSeries application programming interface (API), issuing such calls as MQPUT to put a message onto a queue and MQGET to get a message from a queue. In this specification, the terms "get" and "put" are used generally interchangeably with the terms "read" and "write", respectively. MQSeries is described in such publications as MQSeries Planning Guide, IBM GC33-1349-07 (January 1999), incorporated herein by reference.

The IBM S/390® Parallel Sysplex® configuration is a cluster of interconnected processing nodes with attachments to shared storage devices, network controllers, and core cluster technology components, consisting of coupling facilities, coupling support facilities, and external time references (ETRs). A coupling facility (CF) enables high-performance read/write sharing of data by applications running on each node of the cluster through global locking and cache coherency management mechanisms. It also provides cluster-wide queuing mechanisms for workload distribution and message passing between nodes.

The coupling facility is described in the following patents and publications, incorporated herein by reference:

"IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION", by D. A. Elko et al., Ser. No. 08/420,893, filed Apr. 11, 1995, now U.S. Pat. No. 5,561,809;

"Sysplex Shared Data Coherency Method And Means", by D. A. Elko et al., Ser. No. 07/860,805, filed Mar. 30, 1992, now U.S. Pat. No. 5,537,574;

"Method And Apparatus For Distributed Locking Of Shared Data, Employing A Central Coupling Facility", by D. A. Elko et al., Ser. No. 07/860,808, filed Mar. 30, 1992, now U.S. Pat. No. 5,339,427;

"Command Quiesce Function", by D. A. Elko et al., Ser. No. 07/860,330, filed Mar. 30, 1992, now U.S. Pat. No. 5,339,405;

"Software Cache Management Of A Shared Electronic Store In A Sysplex", by D. A. Elko et al., Ser. No. 07/860,807, filed Mar. 30, 1992, now U.S. Pat. No. 5,457,793;

"Multiple Processor System Having Software For Selecting Shared Cache Entries Of An Associated Castout Class For Transfer To A DASD With One I/O Operation", by D. A. Elko et al, Ser. No. 07/860,806, filed Mar. 30, 1992, now U.S. Pat. No. 5,493,668;

"Command Execution System For Using First And Second Commands To Reserve And Store Second Command Related Status Information In Memory Portion Respectively", by D. A. Elko et al., Ser. No. 07/860,378, filed Mar. 30, 1992, now U.S. Pat. No. 5,392,397;

"Integrity Of Data Objects Used To Maintain State Information For Shared Data At A Local Complex", by D. A. Elko et al., Ser. No. 07/860,800, filed Mar. 30, 1992, now U.S. Pat. No. 5,331,673;

"Management Of Data Objects Used To Maintain State Information For Shared Data At A Local Complex", by J. A. Frey et al., Ser. No. 07/860,797, filed Mar. 30, 1992, now U.S. Pat. No. 5,388,266;

"Clearing Data Objects Used To Maintain State Information For Shared Data At A Local Complex When At Least One Message Path To The Local Complex Cannot Be Recovered", by J. A. Frey et al., Ser. No. 07/860,647, filed Mar. 30, 1992, now U.S. Pat. No. 5,394,542;

"Coupling Facility For Receiving Commands From Plurality Of Hosts For Activating Selected Connection Paths To I/O Devices And Maintaining Status Thereof", by D. A. Elko et al., Ser. No. 08/324,447, filed Oct. 18, 1994, now U.S. Pat. No. 5,463,736;

"Data Processing System And Method For Providing Notification In A Central Processor Of State Changes For Shared Data Structure On External Storage", by J. A. Frey et al., Ser. No. 07/860,809, filed Mar. 30, 1992, now U.S. Pat. No. 5,390,328;

"Method And Apparatus For Performing Conditional Operations On Externally Shared Data", by J. A. Frey et al., Ser. No. 08/383,532, filed Feb. 1, 1995, now U.S. Pat. No. 5,742,830;

"Apparatus And Method For List Management In A Coupled Data Processing System", by J. A. Frey et al., Ser. No. 07/860,633, filed Mar. 30, 1992, now U.S. Pat. No. 5,410,695;

"Interdicting I/O And Messaging Operations In A Multi-System Complex", by D. A. Elko et al., Ser. No. 07/860,489, filed Mar. 30, 1992, now U.S. Pat. No. 5,394,554;

"Method And Apparatus For Coupling Data Processing Systems", by D. A. Elko et al., Ser. No. 07/860,803, filed Mar. 30, 1992, now U.S. Pat. No. 5,317,739;

"Authorization Method For Conditional Command Execution", by D. A. Elko et al., Ser. No. 08/408,446, filed Mar. 22, 1995, now U.S. Pat. No. 5,450,590;

"Dynamically Assigning a Dump Space in a Shared Data Facility to Receive Dumping Information to be Captured", by D. A. Elko et al., Ser. No. 08/471,895, filed Jun. 7, 1995, now U.S. Pat. No. 5,664,155;

"Method And System For Capturing and Controlling Access To Information In A Coupling Facility", by D. E. Neuhard et al., Ser. No. 08/146,647, filed Nov. 1, 1993, now U.S. Pat. No. 5,630,050;

"Method and System for Determining and Overriding Information Unavailability Time at a Coupling Facility", by D. A. Neuhard et al., Ser. No. 08/779,196, filed Jan. 6, 1997, now U.S. Pat. No. 5,875,484;

"Requesting a Dump of Information Stored within a Coupling Facility, in Which the Dump Includes Serviceability Information from an Operating System That Lost Communication with the Coupling Facility", by D. A. Neuhard et al., Ser. No. 08/779,195, filed Jan. 6, 1997, now U.S. Pat. No. 5,860,115;

"Method and Apparatus for Expansion, Contraction, and Reapportionment of Structured External Storage Structures", by D. J. Dahlen et al., Ser. No. 08/304,458, filed Sep. 12, 1994, now U.S. Pat. No. 5,581,737;

"Method of Managing Resources in One or More Coupling Facilities Coupled to One or More Operating Systems in One or More Central Programming Complexes Using a Policy", by R. A. Allen et al., Ser. No. 08/607,053, filed Feb. 26, 1996, now U.S. Pat. No. 5,634,072;

"Method and System for Managing Data and Users of Data in a Data Processing System", by R. A. Allen, Ser. No. 08/146,727, filed Nov. 1, 1993, now U.S. Pat. No. 5,465,359;

"Method and System for Reconfiguring a Storage Structure Within a Structure Processing Facility", by R. A. Allen et al., Ser. No. 08/544,941, filed Oct. 18, 1995, now U.S. Pat. No. 5,515,499;

"Method for Coordinating Executing Programs in a Data Processing System", by R. A. Allen et al., Ser. No. 08/439,269, filed May 9, 1995, now U.S. Pat. No. 5,604,863;

"Coherence Controls for Store-Multiple Shared Data Coordinated by Cache Directory Entries in a Shared Electronic Storage", by K. S. Carpenter et al., Ser. No. 08/148,707, filed Nov. 8, 1993, now U.S. Pat. No. 5,544,345;

"Method and System for Log Management in a Coupled Data Processing System", by R. V. Geiner et al., Ser. No. 08/632/683, filed Apr. 15, 1996, now U.S. Pat. No. 5,737,600; and J. M. Nick et al., "S/390 cluster technology: Parallel Sysplex", IBM Systems Journal, vol. 36, no. 2, 1997, pages 172–201.

In the field of this invention it is known that fuzzy backup of a database can be achieved by copying the database in parallel with updates by a database engine to create a 'fuzzy' backup, and then (if required) restoring the database from that fuzzy backup and forward recovering it by application of log records cut by the database engine which describe the updates that were performed since the start of the fuzzy backup.

In MQSeries systems it is possible to exploit the Coupling Facility List Structure architecture for the storage of messages on shared queues.

However, this approach has the disadvantages that:
1. For queues consisting largely of messages which exist for a short time the cost, size and duration of that fuzzy backup is much higher than necessary.
2. High fuzzy backup costs result in less frequent fuzzy backups for a given cost. Less frequent and longer fuzzy backup results in more update data on the log between each fuzzy backup. Restore time is a function of the fuzzy backup size and the amount of update data to be replayed from the log since the beginning of the last complete fuzzy backup. So restore time is also longer than necessary.

STATEMENT OF INVENTION

Accordingly, the invention provides a data processing arrangement comprising: at least one data processing system; store means coupled to the at least one data processing system and arranged to store data associated with the at least one processing system; backup means for holding a backup of data held in the store means; record log means for recording changes in data stored in the store means; and restore means coupled to the store means, the backup means and the record log means for restoring store means data from the backup means and the record log means in event of failure; and backup testing means for testing the age of elements of store means data and for backing up the elements of store means data only if the ages are greater than a predetermined threshold.

According to another aspect, the invention provides a method of operation in a data processing arrangement comprising: at least one data processing system; store means coupled to the at least one data processing system and arranged to store data associated with the at least one processing system; backup means for holding a backup of data held in the store means; record log means for recording changes in data stored in the store means; and restore means coupled to the store means, the backup means and the record log means for restoring store means data from the backup means and the record log means in event of failure, the method comprising in the backup means performing backup only of elements of store means data which are older than a predetermined threshold.

According to another aspect, the invention provides a computer program for backing up data in a data processing system, the computer program comprising program code means adapted to perform the steps of: backing up only elements which are older than a predetermined threshold; and recording changes to the data in the data processing system.

Preferably, the program code means is further adapted to perform the step of: restoring data from the backup and the changes recorded.

Preferably the program code means is further adapted to perform a restore of messages from the backup and from replay of the recorded changes from a time substantially equal to the predetermined threshold before start of the backup.

BRIEF DESCRIPTION OF THE DRAWINGS

A preferred embodiment of the present invention will now be described, by way of example only, and with reference to the following drawings.

DESCRIPTION OF PREFERRED EMBODIMENT

The following terms, used throughout this description, are reproduced here for ready reference.

A "backout" (or "abort") is an operation that reverses all the changes made during the current unit of work. After the operation is complete, a new unit of work begins.

A "commit" is an operation that applies all the changes made during the current unit of work. After the operation is complete, a new unit of work begins.

A "syncpoint" is an intermediate or end point during processing of a transaction at which the transaction's protected resources are consistent. At a syncpoint, changes to the resources can safely be committed, or they can be backed out to the previous syncpoint.

A "unit of work" is a recoverable sequence of operations performed by an application between two points of consistency. A unit of work begins when a transaction starts or after a user-requested syncpoint. It ends either at a user-requested syncpoint or at the end of a transaction.

Figure 1:
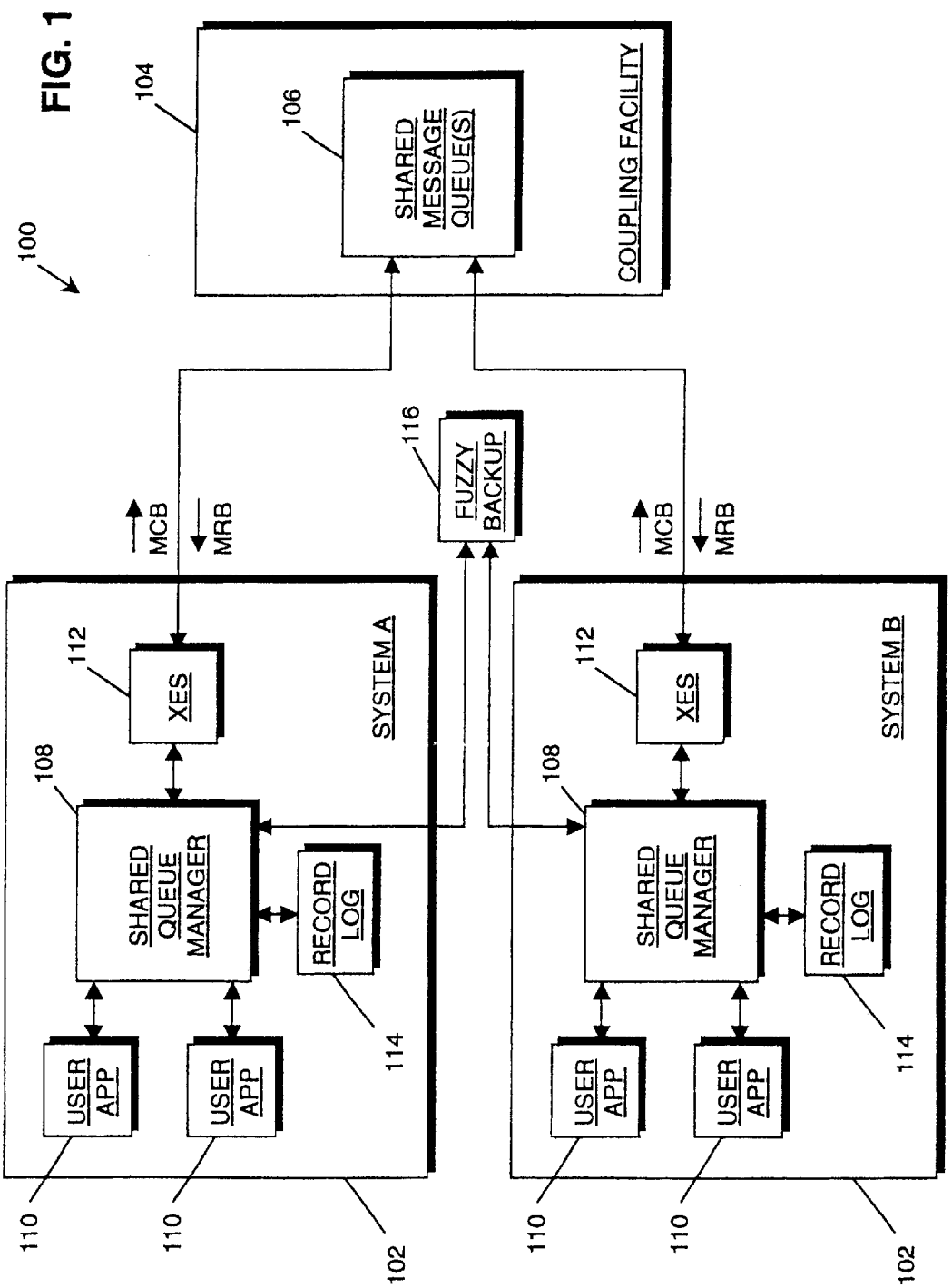
FIG. 1 shows an MQSeries multiple-system complex (sysplex) incorporating a preferred embodiment of the present invention.

FIG. 1 shows the general configuration of an MQSeries system complex (sysplex) 100 incorporating the present invention. Sysplex 100 comprises a plurality of systems 102 (an exemplary two of which, System A and System B, are shown), each of which is connected to a coupling facility (CF) 104 within which one or more shared message queues 106 are maintained. As is conventional, each system 102 comprises one or more processors and an operating system (not separately shown) and may constitute either a separate physical machine or a logical partition of a logically partitioned machine. Similarly, coupling facility 104 may constitute either a separate physical machine or a logical partition of a logically partitioned machine. Although the invention is not so limited, in a preferred embodiment the physical machines may be IBM S/390 Parallel Enterprise Server® processors, while the operating system is the IBM OS/390® operating system.

Within each system 102, user applications 110 perform sequences of operations, referred to herein as units of work (UOWs), on shared message queues 106 via a shared queue manager (SQM) 108 resident on that system. Shared queue managers 108 on different systems 102 that share the same message queue 106 are referred to herein as a queue-sharing group (QSG). Each shared queue manager 108 in turn interacts with the coupling facility via a component 112 of the OS/390 operating system known as Sysplex Services for Data Sharing (XES). Sysplex Services for Data Sharing (XES) is described more fully in the IBM publication MVS/ESA Programming: Sysplex Services Guide, GC28-1495-02 (June 1995), incorporated herein by reference.

User applications 110 on a system 102 interact with the shared queue manager 108 on that system via a series of Message Queue Interface (MQI) calls, the most important of which are MQPUT (to put a message onto a message queue 106) and MQGET (to get a message from a message queue 106). In response to such a call, shared queue manager 108 issues a call to XES 112 to invoke a requested system service to communicate with the coupling facility 104. In response to receiving a call from a shared queue manager 108, XES 112 sends an appropriate message command block (MCB) containing data and other operands to the coupling facility 104 to perform the requested operation. XES 112 receives back from the coupling facility 104 a message response block (MRB) containing data and/or a response code. As part of its list-processing capability, coupling facility 104 performs requested operations on lists composed of one or more entries.

Each shared queue manager 108 maintains a record log 114 of all message transactions involving the CF 104. Periodically, one of the shared queue managers 108 uses XES services 112 to read the contents of the coupling facility 104 and record them in a fuzzy backup 116.

Shared queue messages are stored as list entries in one or more coupling facility (CF) list structures in the CF 104. Applications running on multiple queue managers in the same queue sharing group (QSG) anywhere in the sysplex 100 can then access these shared queue messages. This provides continuous availability, scalable capacity, and automatic pull workload balancing.

Support for persistent shared queue messages can be provided by periodically taking nondisruptive fuzzy backups of each CF list structure, and having each queue manager in the QSG log (i) the message identification and message content of each shared queue message it MQPUTs and (ii) the message identification of each shared queue message it MQGETs. If the CF list structure should fail its shared queue messages can then be recovered by restoring a latest fuzzy backup of that CF structure, positioning the recovery log of each queue manager in the QSG to the time of the fuzzy backup, and then replaying the shared queue update operations from these logs in time stamp order across the QSG into the CF structure.

If a CF structure should fail then a user will want to recover it from the fuzzy backup and recovery logs as quickly as possible. The time taken to replay the recovery logs is typically the major portion of this recovery time. This can be minimised by taking frequent fuzzy backups and by efficient processing during the recovery log replay process.

The present invention preferably allows fuzzy backups of coupling facility list structures containing shared queue messages to be made smaller and more efficient to minimise restore time. The advantage is that the size of the fuzzy backup is smaller and takes less time and resource to create. This therefore affords the opportunity to take more frequent fuzzy backups, which reduces the amount of recovery log to replay and thus minimises restore time.

It has been recognised by the inventor(s) that, in a well behaved queue manager system such as an MQSeries queue manager system, most shared queue messages reside on a queue for a short period of time only, and can safely be excluded from the fuzzy backup if at any subsequent restore the recovery log is replayed from a time slightly before the fuzzy backup start time.

Figure 2:
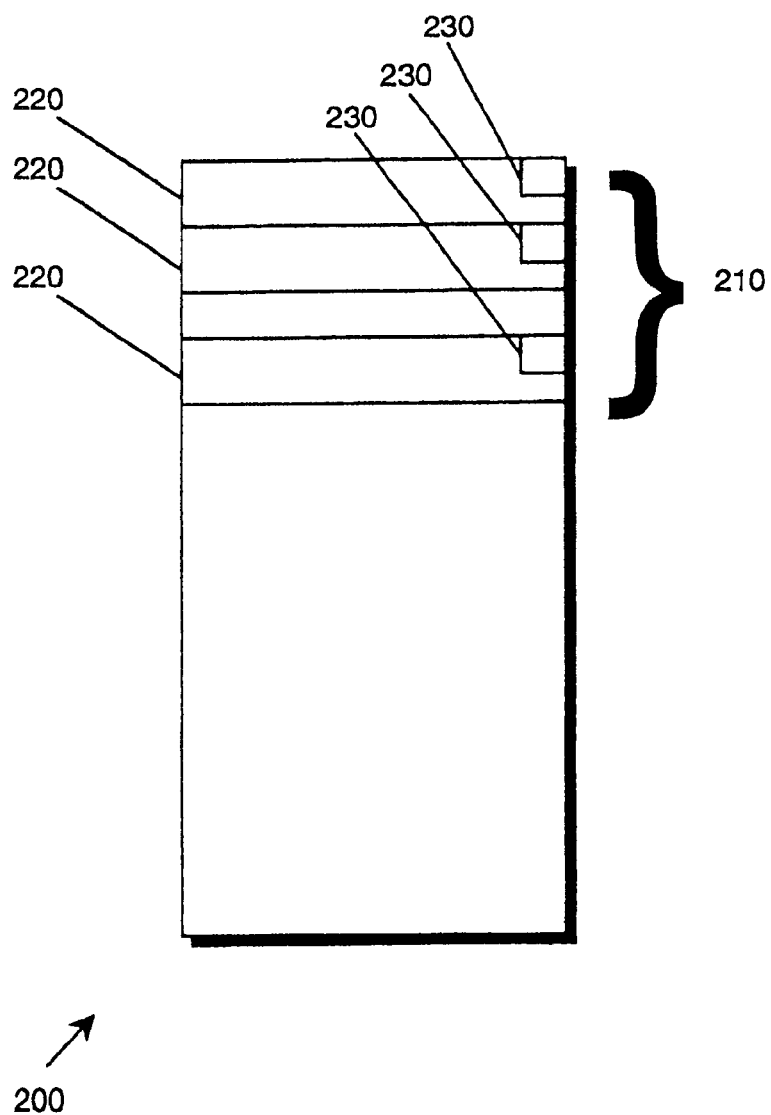
FIG. 2 shows a block-schematic illustration of the coupling facility list structure used in the sysplex of FIG. 1.

Referring now to FIG. 2, in a list structure 200 in the CF 106, each shared queue corresponds to a list header 210. Each shared queue message corresponds to a list entry 220 within that list header. A unique time of creation indicator 230 is present in the key of each CF list structure element.

As will be described in more detail below, based on the unique time of creation indicator 230 in each message, during backup only messages older than some given age (in the example of this preferred embodiment, approximately 30 seconds) are written to the fuzzy backup 116. This is straightforward and efficient as the unique time of creation indicator 230 is present in the key of each CF list structure element.

Figure 3:
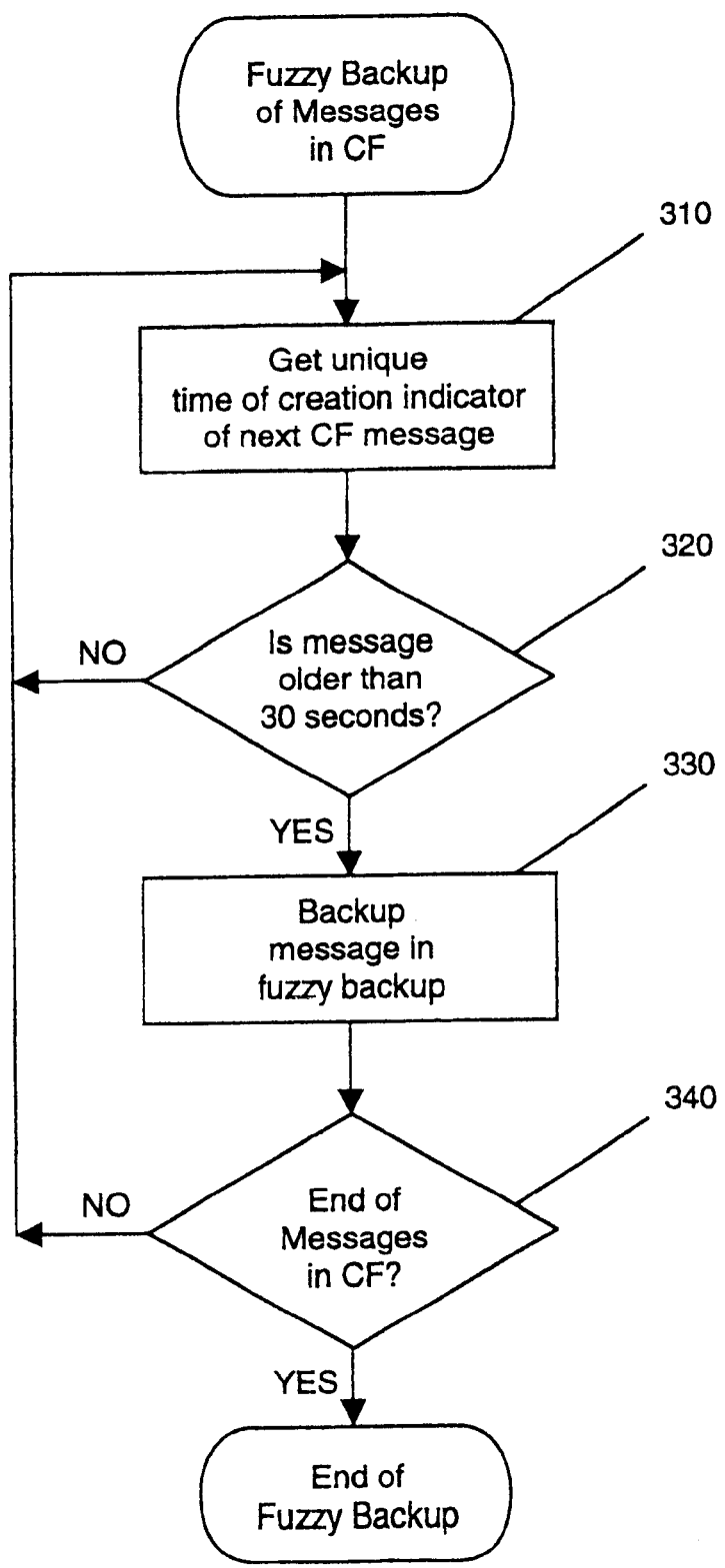
FIG. 3 shows a flowchart illustrating the 'message backup' method sequence in the CF used in the system of FIG. 1.

Referring now to FIG. 3, the procedure used in the sysplex 100 to produce a fuzzy backup 116 consists of the following steps:

| | |
|---|---|
| Step 310 | The unique time of creation indicator 230 of the next CF message is obtained from the CF list structure |
| Step 320 | The age of the message is calculated from the unique time of creation indicator 230, and tested to determine if the age of the message is greater than 30 seconds. If the message is not older than 30 seconds, the procedure returns to step 310. |
| Step 330 | If the message is older than 30 seconds, the message is backed up in the fuzzy backup 116. |
| Step 340 | The CF is tested to determine whether there are further messages in the CF 104 that may require backing up. If the end of messages has not been reached, the procedure returns to step 310. If the end of messages has been reached, the fuzzy backup ends and the procedure terminates. |

Typically, more than 80% of messages on a shared queue at a given instant remain on that queue for a time of the order of seconds rather than minutes. Thus, fuzzy backup of messages older than a few seconds (e.g., 30 seconds is significantly cheaper (in terms of resource cost) and quicker than a fuzzy backup of all messages.

Thus, more frequent fuzzy backups can be afforded. Typically four or five times as many 'except most recent message' backups can be performed for the cost of a full fuzzy backup. Without this technique, the interval between fuzzy backups would typically be of the order of several tens of minutes (if not hours). With this technique, the interval between affordable fuzzy backups can be significantly reduced. This reduction is of the order of four to five times for the typical case where more than 80% of messages exist for less than a few seconds. Thus, the reduction is typically of the order of minutes (if not tens of minutes).

For the less typical case where messages are mostly long-lived, the cost is not significantly greater than it would have been without this technique, although the advantage is also significantly reduced.

In the event of a CF failure, the scope of recovery log which must be replayed without this technique is on average half the interval between fuzzy backups. With this technique it is on average half of the shorter (by minutes, if not tens of minutes) interval between fuzzy backups plus a few extra seconds of recovery log replay necessary to restore messages younger than the given age at the time of last fuzzy backup.

For the less typical case where messages are mostly long lived the restore time is longer but only by the few extra seconds of recovery log replay.

Thus this technique reduces restore time, because the scope of recovery log which must be replayed to restore a CF list structure containing shared queue messages is reduced by the order of minutes (if not tens of minutes).

It will be understood that although the invention has been described above in the context of backing up messages from a coupling facility list structure in an MQSeries sysplex, the invention is not necessarily limited to such backup and may be used more generally in other backup arrangements in which data records have an indication of age. Further, it will be understood that the 'threshold age' of 30 seconds used in the example described above may alternatively be lesser or greater than 30 seconds, as desired.

Thus, in summary, it will be understood that the technique described above for reducing fuzzy backup costs and restore time by not backing up most recent objects described above provides the advantages of reduction of fuzzy backup cost and reduction of restore time.

What is claimed is:

1. A data processing arrangement comprising:
   at least one data processing system;
   store means coupled to the at least one data processing system and arranged to store data associated with the at least one processing system;
   backup means for holding a backup of data held in the store means;
   record log means for recording changes in data stored in the store means; and
   restore means coupled to the store means, the backup means and the record log means for restoring store means data from the backup means and the record log means in event of failure; and
   backup testing means for testing age of elements of store means data and for backing up the elements of store means data only if the ages are greater than a predetermined threshold;
   wherein the restore means performs a restore of messages from the backup means and from replay of the log record means from a time substantially equal to a predetermined threshold before start of the backup means backup.

2. The data processing arrangement of claim 1 wherein the predetermined threshold is substantially 30 seconds.

3. The data processing arrangement of claim 1 wherein the store means comprises coupling means coupled to the at least one data processing system and arranged to store at least one shared queue of data associated with the at least one processing system.

4. The data processing arrangement of claim 1 wherein the at least one data processing system comprises an S/390 processor arranged to run an OS/390 operating system.

5. A method of operation in a data processing arrangement comprising:
   providing at least one data processing system;
   coupling store means to the at least one data processing system and arranging to store data associated With the at least one processing system;
   holding in backup means a backup of data held in the store means; recording changes in data stored in the store means in record log means; and
   coupling a restore means to the store means, the backup means and the record log means for restoring store means data from the backup means and the record log means in event of failure;
   performing backup only of elements of store means data which are older than a predetermined threshold in the backup means;
   wherein the method further comprises performing a restore of messages from the backup means and from replay of the log record means from a time substantially equal to a predetermined threshold before start of the backup means backup in the restore means.

6. The method of claim 5 wherein the predetermined threshold is substantially 30 seconds.

7. The method of claim 5 wherein the store means comprises coupling means coupled to the at least one data processing system and arranged to store at least one shared queue of data associated with the at least one processing system.

8. The method of claim 5 wherein the at least one data processing system comprises an S/390 processor running an OS/390 operating system.

9. A computer program product in a computer readable medium for backing up data in data processing system, said computer program comprising program code means adapted to perform the steps of: storing data associated with at least one processing system in a store means; holding a backup of data held in the store means; recording changes of data stored in the store means in record log means; and restoring store means data from the backup means and the record log means in event of failure; backing up only elements which are older than a predetermined threshold; and recording changes to the data in the data processing system; wherein the program code means is further adapted to perform a restore of messages from the backup and from replay of the recorded changes from a time substantially equal to a predetermined threshold before start of the backup.

10. The computer program of claim 9, wherein the program code means is further adapted to perform the step of:
    restoring data from the backup and the changes recorded.

* * * * *